Inventors
James B. Knighton
Werner Knoch
Robert K. Steunenberg
Attorney

Distribution of Plutonium between 50 m/o $MgCl_2$-30 m/o $NaCl$-20 m/o $KCl$ salt and Zn-Mg Alloy Inventors
James B. Knighton
Werner Knoch
Robert K. Steunenberg
Attorney United States Patent Office 3,326,673
Patented June 20, 1967

3,326,673
PROCESS FOR SEPARATING PLUTONIUM FROM URANIUM FROM FISSION PRODUCTS
James B. Knighton, Joliet, Werner Knoch, Willow Springs, and Robert K. Steunenberg, Naperville, Ill., assignors to the United States of America as represented by the United States Atomic Energy Commission
Filed Sept. 23, 1966, Ser. No. 582,210
9 Claims. (Cl. 75—84.1)

The invention described herein was made in the course of, or under, a contract with the United States Atomic Energy Commission.

This invention relates to the separation of plutonium, uranium and fission products one from the other, and in particular to the separation of these materials by pyrochemical techniques.

Pyrochemical separations involve high-temperature chemical reactions, often with molten metals and salts. Because pyrochemical separation processes require comparatively small volumes of reagents, utilize few separate process steps, and produce solid, low-volume wastes, intensive development work is in progress to produce a process adaptable to industrial requirements. Patents 3,282,681 and 3,284,190 deal in general with pyrochemical methods for fissionable material separation.

Patent 3,282,681 defines a method for separating uranium, plutonium and refractory and noble metal fission products by dissolving the uranium, plutonium and refractory and noble metal fission products in a molten magnesium alloy at about 600–650° C. from which most of the uranium values precipitate. The magnesium alloy containing the plutonium values and refractory and noble metal fission products is contacted with a molten salt containing magnesium chloride which selectively oxidizes the plutonium values to a plutonium chloride soluble in the molten salt, while the refractory and noble metal fission products remain in the molten magnesium alloy. The plutonium-chloride-containing salt is then contacted with a molten zinc alloy containing 2–10 percent magnesium by weight that reduces the plutonium chloride to metallic plutonium and scrubs it from the salt. Once the zinc-magnesium alloy becomes saturated with plutonium values further addition of plutonium to the alloy results in precipitation of a zinc-plutonium intermetallic.

Patent 3,284,190 defines a method for separating uranium values from noble and refractory metal fission products by dissolving the values in a molten copper alloy containing 4–8 percent magnesium by weight, contacting the resulting mixture with a magnesium-cation-rich molten alkali metal chloride or alkaline earth metal chloride salt that oxidizes the uranium to uranium chloride, and contacting the uranium-containing salt with a molten magnesium alloy which reduces the uranium chloride to a metallic uranium precipitate.

The aforementioned applications, either separately or taken together, exhibit certain deficiencies in the separation of uranium from plutonium. The 3,284,190 process does not separate plutonium from uranium, and the uranium insolubility requirement in the 3,282,681 process restricts the choice of alloy composition and also restricts the process temperature to a disadvantageously low value.

The pyrochemical process of this invention is based on the fact that a molten transport salt in contact with a molten alloy saturated with a solute metal reaches an equilibrium condition where some of the solute in the molten alloy transfers to the salt. A measure of the extent to which a solute transfers from the metal solvent to the transport salt is the distribution coefficient, Kd, defined as the ratio of the solute concentration in the salt to the solute concentration in the metal, at equilibrium for a metal solvent saturated with solute.

If the solute concentration in the transport salt is large compared to the solute concentration in the metal or alloy solvent, that is the Kd is large, then the metal or alloy is termed a "donor." Conversely, if the Kd is small the metal or alloy is termed an "acceptor." While for all possible alloys there is no sharp dividing line between acceptors and donors, generally when two alloys are compared one will be the donor, the other an acceptor.

Usually, two or more saturated alloys spaced one from the other in mutual contact with a salt produce at equilibrium different solute concentrations in the salt. These different solute concentrations within the salt set up a concentration gradient. Since solute in the salt in an area of high concentration will migrate to areas of low solute concentration in order to produce a salt with uniform solute concentration, equilibriums attained locally between each alloy and the salt will be disturbed. The solute concentration in the salt resulting from the salt-donor alloy equilibrium will decrease, while the solute concentration resulting from the salt-acceptor alloy equilibrium will increase. Since the acceptor alloy at equilibrium is already saturated with solute, an increase in the solute concentration in the salt causes precipitation of solute from the alloy. Similarly, a decrease in solute concentration in the salt at equilibrium with the donor alloy causes more solute to transfer from the donor, and the net result is solute transfer from the donor alloy to the acceptor alloy.

It is the principal object of this invention to provide a process for the recovery and separation of plutonium values from uranium values and from refractory and noble metal fission products which reduces the number of separate process steps and handling. Further objects as well as advantages will appear in the description of the invention.

The process of this invention comprises dissolving uranium, plutonium, and refractory and noble metal fission product values in a first alloy that is a donor with respect to the plutonium and uranium values, contacting the first alloy with a molten salt, contacting the molten salt with a second alloy that is a uranium acceptor but a plutonium donor with respect to the first alloy, and contacting the molten salt with a third alloy that is a plutonium acceptor with respect to the first and second alloys.

The invention may be better understood by reference to the following figures and experiments, in which.

Figure 1:
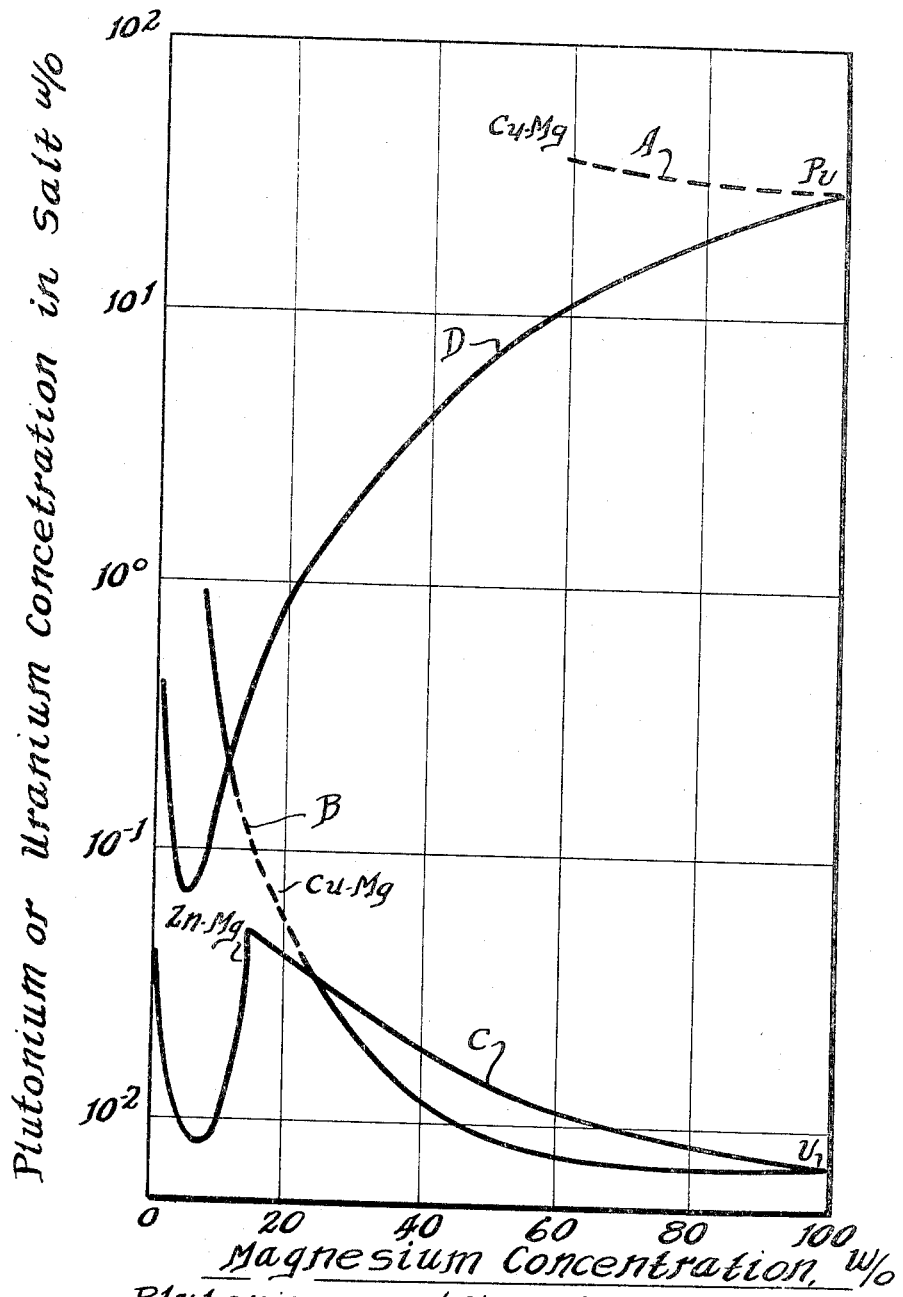
FIGURE 1 is a plot of the plutonium or uranium concentration in magnesium chloride above magnesium alloys saturated with plutonium or uranium at 750° C. as a function of the magnesium concentration of the alloy.

Reference to FIGURE 1 shows, at line A, that any magnesium-copper alloy is a good plutonium donor because of the large distribution coefficient of plutonium; however, if a copper-magnesium alloy is to be chosen for the first alloy in the process, it must be a good uranium donor also. In this case, uranium is the controlling factor and the best uranium donor at 750° C. is a copper-7 w/o magnesium composition; see line B. While it would appear from the general shape of line B that superior results would be obtained with an alloy of lower magnesium content, the explanation of FIGURE 2 will show why such an alloy is not preferred. It should be noted that the uranium donor characteristics of the copper-magnesium alloy change markedly with small changes in the magnesium content. A change of from about 7 w/o to about 10 w/o of magnesium changes the uranium concentration in the salt from about 0.87 w/o to about 0.30 w/o. As the 7 w/o magnesium alloy is almost three times as good a uranium donor as is the 10 w/o magnesium alloy, the importance of the magnesium content in the copper-magnesium alloy is obvious.

Figure 2:
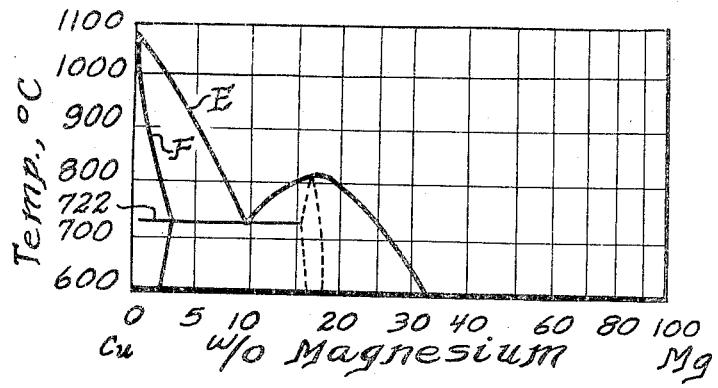
FIGURE 2 is a phase diagram of the copper-magnesium system.

Plutonium, uranium or refractory and noble metal fission product values in other than the most reduced state will not dissolve in a molten alloy but must be reduced by the alloy before dissolution takes place. Hereafter, reference to dissolving uranium, plutonium or refractory and noble metal fission product values will assume that the values are in the most reduced state. The mechanism of mass transfer of solute from donor metal to transport salt is oxidation. As uranium or plutonium values in the metal are oxidized and dissolved in the salt, magnesium cations in the salt are reduced and precipitate into the donor alloy. In the case where the first process alloy is a copper-magnesium alloy, magnesium enrichment is undesirable, and in order to prevent serious fluctuations in the magnesium concentration which would adversely affect its uranium donor characteristics, the alloy is maintained as a two phase system. The copper-magnesium phase diagram of FIGURE 2 shows that a temperature of 750° C. the liquid in the two phase system will be a copper-8 w/o magnesium alloy, see liquidus line E, and the solid will be a copper-2 w/o magnesium alloy, see the solidus line F. The fact that the solid alloy contains less magnesium than the liquid alloy allows the solid to act as a magnesium buffer to prevent magnesium increase in the liquid alloy over about 8 w/o. In practice, the first alloy is even lower in magnesium concentration than would appear possible from FIGURE 2, because the addition of plutonium, uranium and refractory and noble metal fission product values to the copper-magnesium alloy decreases the magnesium concentration in the overall combination to about 6½ w/o. Since the donor characteristics of a copper-magnesium alloy, as shown in FIGURE 1, line B, seem to improve with a decrease in magnesium concentration, there is no reason to believe that a 6½ w/o magnesium alloy would not be markedly better than the 8 w/o magnesium alloy. Of course, the question arises, why not raise the temperature of the first alloy to obtain lower magnesium concentrations, since the liquidus composition at 900° C. is about 6 w/o magnesuim. While additional reasons will become apparent later, an increase in the corrosive properties of molten salts and metals is a principal deterrent.

The process of this invention will not separate plutonium values from rare earth values so they must be removed from the mixture of uranium, plutonium, refractory and noble metal values before the process is initiated. The plutonium, uranim, refractory and noble metal values are dissolved in the buffered copper-8 w/o magnesium alloy at a temperature of about 750° C. As may be seen from FIGURE 2, any copper-magnesium alloy less than about 10 w/o magnesium will become a solid at temperatures under 722° C.; therefore, 722° C. is the lowest operable temperature for a process using essentially a binary copper-<10 w/o magnesium alloy. Additionally, if a 100% magnesium chloride salt is used, the process temperature must be at least about 716° C., the melting point of the salt. Lower process temperatures are desirable, because, as will be shown later, recovery of uranium and plutonium is enhanced; to that end various salts other than 100% magnesium chloride may be used, such as combinations of alkali or alkaline earth halides and magnesium chloride.

Once the copper-magnesium alloy with the dissolved uranium, plutonium, refractory and noble metal fission product values is brought into contact with the molten magnesium chloride, an equilibrium is established according to lines A and B in FIGURE 1 if the copper-magnesium alloy is saturated with uranium and plutonium. In practice, the alloy is saturated with uranium but, due to the high solubility of plutonium in the alloy, plutonium saturation is not attained, and the equilibrium between the alloy and the salt, for any given alloy concentration, will be represented by a value somewhat below line A. After equilbrium is established, either plutonium or uranium must be removed from the salt while the other remains. It has been found most advantageous to remove uranium values first. For selective uranium removal, an alloy must be used which is a good uranium acceptor and plutonium donor; see FIGURE 1 where any copper-magnesium alloy, lines A and B, with greater than about 40 w/o magnesium is very good, and any zinc-magnesium alloy, lines C and D, with greater than about 50 w/o magnesium is satisfactory. Of course, 100% magnesium would seem to be best, but that presents problems, because magnesium is less dense than magnesium chloride; therefore, the magnesium metal would float on the magnesium chloride and special equipment would have to be designed. A zinc-magnesium alloy is preferred, not because a copper-magnesium alloy is inoperable, but because separation of the uranium from the alloy, although not part of this process, is usually accomplished by distillation, and copper with a boiling point of 2336° C. is not as volatile as zinc with a boiling point of 907° C. As shown in FIGURE 1, lines C and D, for a zinc-60 w/o magnesium alloy, the weight percent of uranium in the salt is about $1 \times 10^{-2}$, and the weight percent of plutonium in the salt is about $1 \times 10^1$. These figures show that a zinc-60 w/o magnesium alloy is a better uranium than plutonium acceptor by a factor of 1000. Obviously, a zinc-magnesium alloy with a greater magnesium concentration would produce better results, and the above example was used only for illustrative purposes.

The ideal third alloy should be a plutonium acceptor and uranium donor. However, reference to FIGURE 1 shows that no copper-magnesium alloy is a good plutonium acceptor. A zinc-magnesium alloy of less than about 20 w/o magnesium may be termed a plutonium acceptor, but all zinc-magnesium alloys are better uranium acceptors than plutonium acceptors. The best zinc-magnesium plutonium acceptor is a zinc-5 w/o magnesium alloy, which is a better uranium acceptor by a factor of 10; see FIGURE 1, lines C and D. Although a zinc-magnesium alloy with up to about 15 w/o magnesium is a better uranium than plutonium acceptor by a factor of 10, this difference is tolerable, and a plutonium separation process based on these alloys is feasible. While cadmium-magnesium alloys or cadmium-zinc-magnesium alloys could also be used, cadmium is not only expensive but has a disadvantageously low boiling point. In addition, magnesium concentration control is more difficult with cadimum-magnesium alloys than with zinc-magnesium alloys, and the latter are preferred. Since any zinc-magnesium alloy is a better uranium than plutonium acceptor, uranium values should be removed before the plutonium removal is attempted.

Both uranium and plutonium precipitate from a zinc-<20 w/o magnesium alloy as an intermetallic, either $U_2Zn_{17}$ or $PuZn_{17}$. At first blush, this seems undesirable because the alloy would become magnesium-rich, hence a poor plutonium acceptor. A zinc-5 w/o magnesium alloy is preferred because the zinc consumed through uranium or plutonium precipitation is balanced by the magnesium consumed through the reduction of the uranium or plutonium chloride from the salt, so that the remaining acceptor alloy still contains about 5 w/o magnesium.

Figure 4:
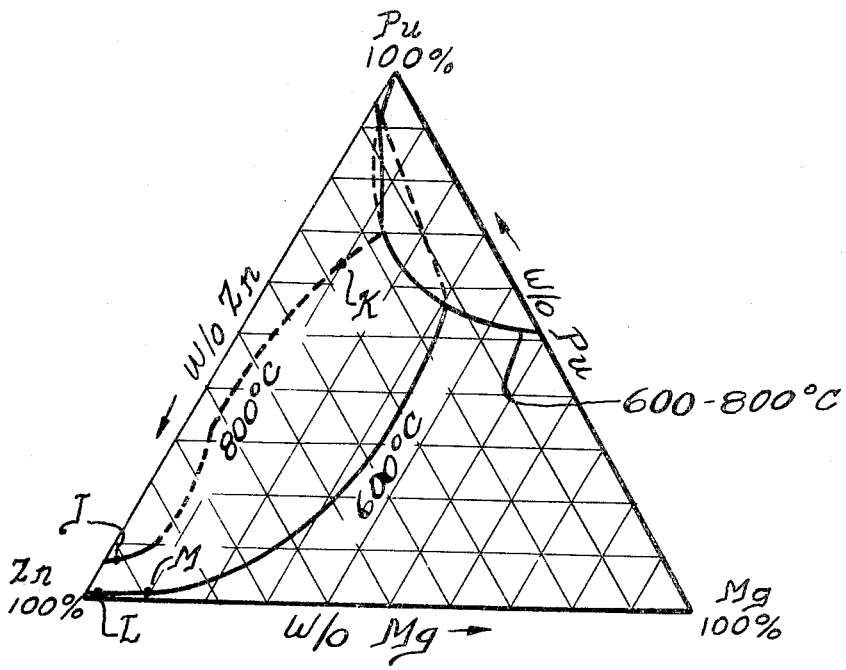
FIGURE 4 is a plot of the liquidus temperature for the ternary plutonium-magnesium-zinc system at temperatures of 600° C. and 800° C.
Figure 3:
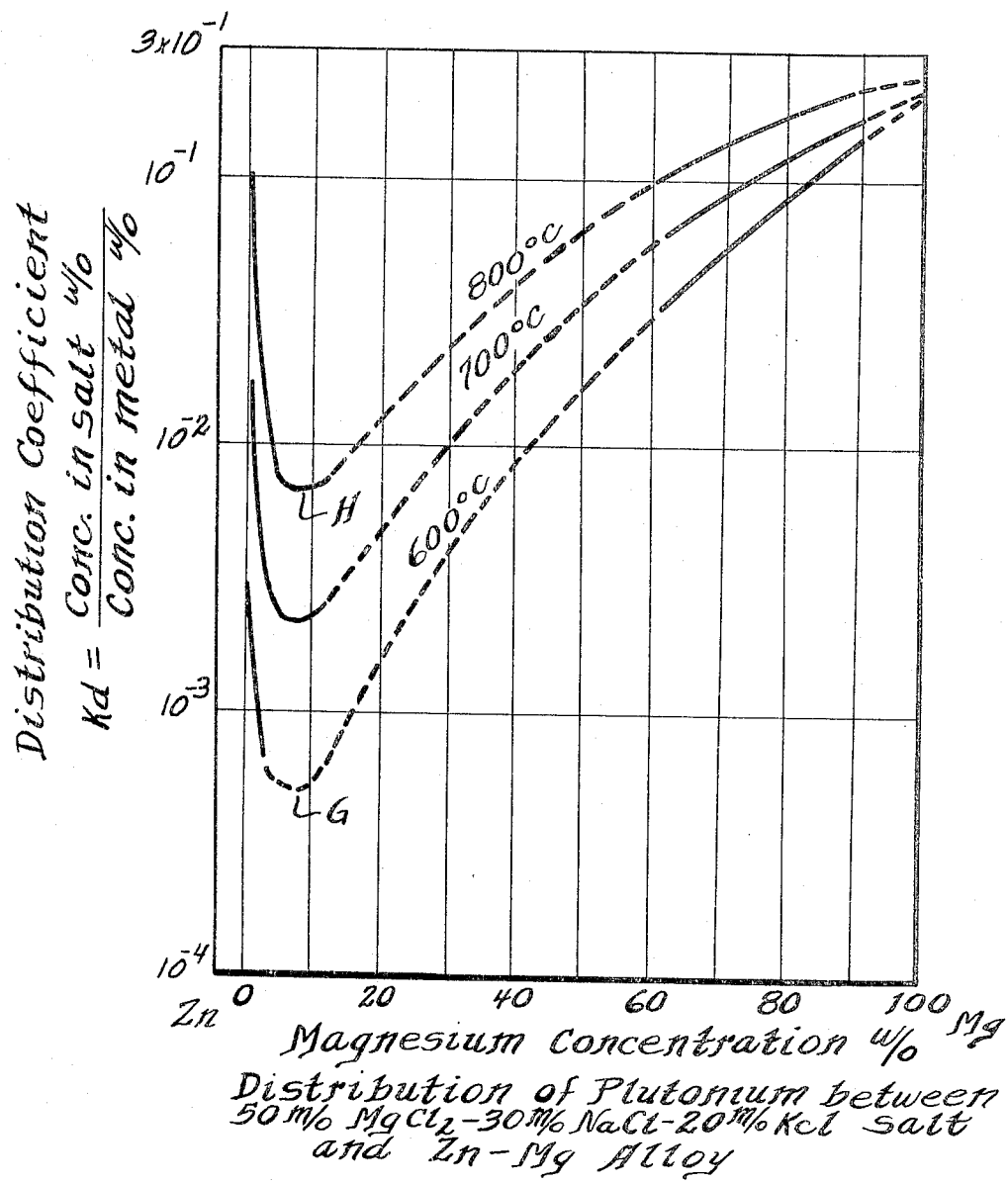
FIGURE 3 is a plot of the plutonium distribution coefficient in a molten salt-molten magnesium alloy system for different temperatures as a function of the magnesium concentration in the alloy.

Reference to FIGURE 3 shows that the higher the temperature the greater the amount of solute remaining in the transport salt, so that separation of plutonium or uranium from the salt is enhanced at lower temperatures. For a zinc-8 w/o magnesium alloy, an increase from 60° C. to 800° C. results in more than 10 times the amount of solute staying in the salt phase, see points G and H. Further, FIGURE 4 shows that plutonium solubility in a zinc-magnesium alloy at higher temperatures increases more quickly for small changes in magnesium concentration than at lower temperatures. For instance, at 800° C., the plutonium solubility in a zinc-2 w/o magnesium alloy is about 7 w/o, point J, and in a zinc-10 w/o magnesium alloy about 63 w/o, point K. At 600° C., the plutonium solubility in a zinc-2 w/o magnesium alloy is less than 1 w/o, point L, and in a zinc-10 w/o magnesium alloy the solubility is still less than 1 w/o, point M. Hence it is easily seen that at lower temperatures the magnesium concentration in the plutonium acceptor alloy need not be as closely controlled as at higher temperatures, and this is another reason for not operating the entire system at temperatures around 900° C. in order to enhance uranium-donor characteristics of the copper-magnesium alloy.

It is clear that the zinc-magnesium alloys are advantageously operated at temperatures of about 600° C., but the copper-magnesium alloy must be at least 722° C. in order to remain a liquid. When all three alloys, that is, the uranium-plutonium donor, the uranium acceptor-plutonium donor, and the plutonium acceptor, are maintained within a single container, it is difficult to operate the alloys at appreciably different temperatures. Individually heating and/or separating the alloys would enable the copper-magnesium alloy to be maintained at about 900° C. while the acceptor alloys remained about 600° C. Of course, a transport salt of 100% magnesium chloride could not be used, as its melting point is about 716° C., but a salt mixture such as 50 m/o MgCl$_2$, 30 m/o NaCl, 20 m/o KCl would be acceptable.

Alternatives to operating the system at multiple temperatures are available. As equilibrium between the transport salt and the donor or acceptor alloys is more quickly established when they have been mixed, sequential mixing is another method for improving the separation of uranium values from plutonium values. If all three alloys are in mutual contact with the salt, uranium values may be separated first by mixing the salt, the copper-magnesium alloys and the uranium acceptor-plutonium donor alloy, while the plutonium acceptor alloy is not mixed.

The following experiment will help to understand the process of this invention. The equipment consisted of three 60 milliliter Al$_2$O$_3$ crucibles, one 600 milliliter tantalum crucible, three tantalum stirrers for the Al$_2$O$_3$ crucibles, and a heater. The Al$_2$O$_3$ crucibles were placed inside the tantalum crucible under a helium atmosphere and 150 grams of a copper-8 w/o magnesium alloy were introduced into one Al$_2$O$_3$ crucible, 150 grams of a zinc-3 w/o magnesium alloy were introduced into another, and 150 grams of a zinc-80 w/o magnesium alloy were introduced into the third Al$_2$O$_3$ crucible. 1000 grams of a salt comprising 50 m/o magnesium chloride-30 m/o sodium chloride-20 m/o potassium chloride were introduced into the tantalum crucible, so that the contents of the three Al$_2$O$_3$ crucibles were in mutual contact with the salt. A charge of 48 grams uranium, 11 grams plutonium and 2 grams cerium was introduced into the Al$_2$O$_3$ crucible with the copper-magnesium alloy. Generally the rare earth elements are removed before this separation process is begun, but cerium was used in this experiment to represent any rare earth contaminants that might not be removed; all other fission products except alkali, alkaline earth, yttrium and the rare earths will remain more than 99% in the copper-magnesium alloy. The temperature of the system was brought to 780° C. and the three alloys were stirred at a rate of 150 r.p.m. for about 50 hours. At the end of that time, the system was cooled and samples of the frozen ingots were examined. The following table represents the results of the experiment.

RECOVERY IN PERCENT OF TOTAL

|  | Uranium | Plutonium | Cerium |
| --- | --- | --- | --- |
| Cu—8 w/o Mg | 3 | 0.14 | 16 |
| Zn—3 w/o Mg | 43 | 98 | 83 |
| Zn—80 w/o Mg | 41 | 1 | 0.1 |
| Salt | 12 | 0.9 | 1 |

REMOVAL IN PERCENT OF TOTAL

|  | Uranium | Plutonium | Cerium |
| --- | --- | --- | --- |
| Cu—8 w/o Mg | 97 | 99.86 | 84 |

The first four lines of the table represent in percent the amount of uranium, plutonium and cerium found in the various ingots at the end of the run. The reason for the high value of uranium in the salt is that the run was terminated before final equilibrium between the salt and zinc-80 w/o magnesium alloy was reached. The last line of the table shows the amount of metal removed from the copper-magnesium alloy.

No attempt at sequential contact was made during this experiment which explains the high percentage of uranium in the zinc-3 w/o magnesium alloy. If it is desirable to have a plutonium-uranium mixture, such as when reprocessing core material for a breeder reactor, then the experimental process is entirely applicable. If blanket material in a breeder reactor is to be reprocessed, where essentially complete plutonium and uranium separation is required, then either sequential contact of the salt and the two zinc-magnesium alloys or sequential stirring would largely remedy the uranium transfer to the zinc-3 w/o magnesium alloy. It is obvious from FIGURE 1 that equilibrium between the zinc-80 w/o magnesium alloy and the salt before substantial contact of the salt with the zinc-3 w/o magnesium alloy would result in uranium removal of better than 90%. This is true because the uranium concentration in a magnesium chloride salt at equilibrium with the 80 w/o magnesium alloy is about $8 \times 10^{-2}$. Since the concentration of uranium in its acceptor is a factor of 10 greater than the plutonium concentration in its acceptor, the over-all uranium recovery should be superior. The results of the experiment show a plutonium recovery by the acceptor alloy of 98% and there is no reason to believe that the methods outlined above would not produce a comparable uranium recovery.

It will be understood that the invention is not to be limited to the details given herein but that it may be modified within the scope of the appended claims.

The embodiments of the invention in which an exclusive property or privilege is claimed are defined as follows:

1. A method for separating uranium from plutonium which comprises:
   (a) dissolving material containing plutonium and uranium in a copper-magnesium alloy,
   (b) contacting the plutonium-uranium containing copper-magnesium alloy with a molten magnesium chloride containing salt,
   (c) contacting the magnesium chloride containing salt with a molten metal or alloy selected from the group consisting of magnesium, zinc-magnesium, copper-magnesium, and mixtures thereof, all of said alloys containing a major amount of magnesium to remove uranium from the molten magnesium chloride salt, and,
   (d) contacting the molten magnesium containing salt with an alloy selected from the group consisting of zinc-magnesium, cadmium-magnesium, and mixtures thereof, all of said alloys containing a minor amount of magnesium to remove plutonium from said molten magnesium chloride containing salt.

2. The method of claim 1 wherein the contacting steps are done sequentially.

3. The method of claim 2 wherein the alloy of step (c) is a zinc-magnesium alloy.

4. The method of claim 3 wherein the alloy of step (d) is a zinc-magnesium alloy.

5. The method of claim 4 wherein the magnesium-chloride-containing salt is selected from the group consisting of magnesium chloride; magnesium chloride and alkali metal halides; magnesium chloride and alkaline earth metals halides; and magnesium chloride, alkali metal halides and alkaline earth metal halides.

6. The method of claim 5 wherein the alloy of step (a) has a magnesium content between five and eight percent by weight.

7. The method of claim 6 wherein the alloy of step (c) has a magnesium content of between about seventy and ninety percent by weight.

8. The method of claim 6 wherein the alloy of step (d) has a magnesium content of between about two and about fifteen percent by weight.

9. The method of claim 8 wherein copper-magnesium alloy is maintained at a temperature of about 900° C. and the zinc-magnesium alloys are maintained at a temperature of about 600° C.

References Cited
UNITED STATES PATENTS

| | | | |
|---|---|---|---|
| 3,148,977 | 9/1964 | Teitel et al. | 75—84.1 |
| 3,282,681 | 11/1966 | Knighton et al. | 75—84.1 |
| 3,284,190 | 11/1966 | Knighton et al. | 75—84.1 |

CARL D. QUARFORTH, *Primary Examiner.*

S. TRAUB, *Assistant Examiner.*

UNITED STATES PATENT OFFICE
CERTIFICATE OF CORRECTION

Patent No. 3,326,673                                            June 20, 1967

James B. Knighton et al.

It is hereby certified that error appears in the above numbered patent requiring correction and that the said Letters Patent should read as corrected below.

Column 3, line 26, after "that" insert -- at --; line 47, for "magnesuim" read -- magnesium --; column 4, line 55, for "cadimum" read -- cadmium --; column 6, line 40, for "$8 \times 10^{-2}$" read -- $8 \times 10^{-3}$ whereas the plutonium concentration in a magnesium chloride salt in equilibrium with a zinc-3 w/o magnesium alloy is about $8 \times 10^{-2}$ --.

Signed and sealed this 22nd day of October 1968.

(SEAL)
Attest:

Edward M. Fletcher, Jr.                                             EDWARD J. BRENNER
Attesting Officer                                                        Commissioner of Patents